United States Patent [19]
Woods

[11] Patent Number: 5,150,623
[45] Date of Patent: Sep. 29, 1992

[54] INSPECTION DEVICE FOR FLUSH HEAD BOLTS AND RIVETS

[75] Inventor: Mark A. Woods, Renton, Wash.

[73] Assignee: The Boeing Company, Seattle, Wash.

[21] Appl. No.: 554,674

[22] Filed: Jul. 17, 1990

[51] Int. Cl.⁵ .............................................. B21J 15/28
[52] U.S. Cl. ................................................... 73/865.8
[58] Field of Search ....................... 73/865.8; 358/107; 74/89.15; 221/2, 4, 155, 289

[56] References Cited

U.S. PATENT DOCUMENTS

| | | | |
|---|---|---|---|
| 4,931,658 | 6/1990 | Tole | 358/107 |
| 5,010,412 | 4/1991 | Garris | 358/107 |

Primary Examiner—Robert Raevis
Attorney, Agent, or Firm—Bruce A. Kaser

[57] ABSTRACT

A video imaging system for sequentially measuring the dimensions or tolerances of a plurality of fasteners. The system includes a feed gate in combination with a reciprocating chuck, the latter moving each fastener, one at a time, into the field of view of a pair of orthogonally-oriented cameras. A pair of orthogonally-oriented backlights, one each being directly opposite the field of view of one of the cameras, silhouettes each fastener, and defines a camera image that is digitized for producing fastener dimensions. The orthogonal relationship of the cameras enables the true fasteners position to be calculated relative to each camera.

8 Claims, 13 Drawing Sheets

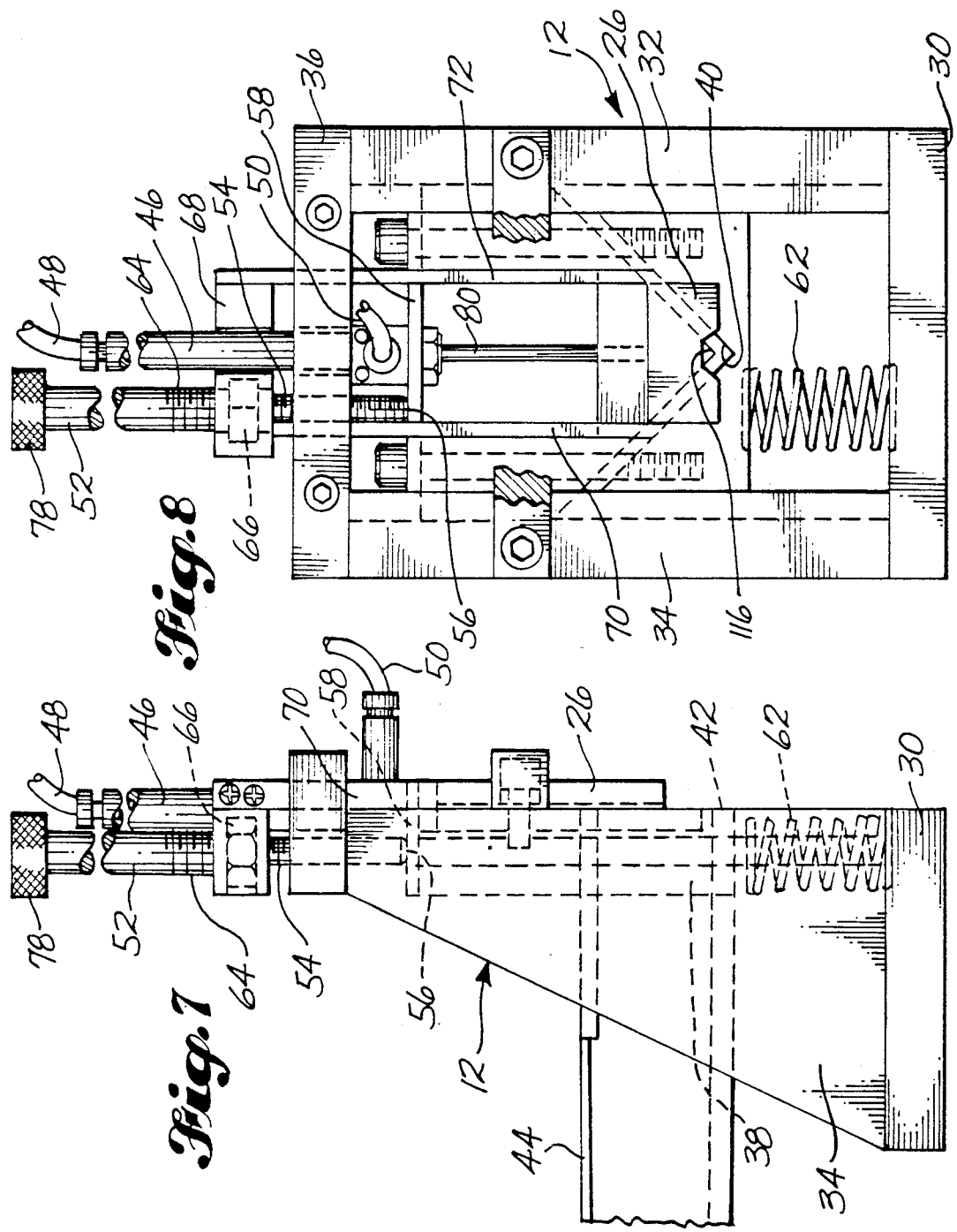

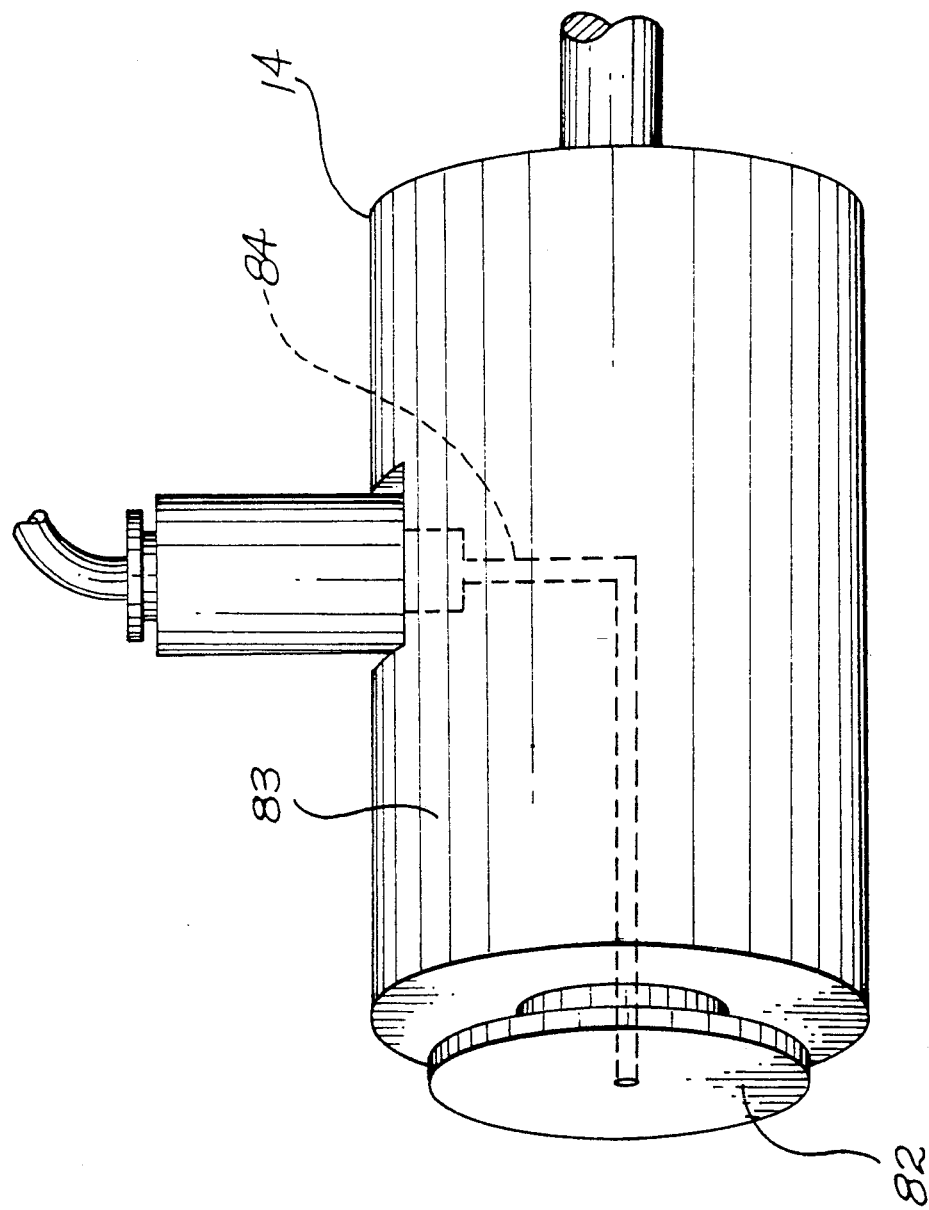

INSPECTION DEVICE FOR FLUSH HEAD BOLTS AND RIVETS

DESCRIPTION

1. Technical Field

This invention relates to automated systems for inspecting part dimensions, and particularly, to automated systems whose function is to inspect the dimensions and tolerances of bolts, rivets and similar fasteners.

2. Background Art

The invention disclosed here is an improvement on an earlier fastener inspection device that is disclosed in U.S. Pat. No. 4,828,159. The earlier device has many features that are similar to the present device, and to facilitate a better understanding of not only the present device, but its differences with respect to the earlier one, the '159 patent is incorporated herein by reference.

In order to use video imaging techniques to measure fastener dimensions and tolerances, it is critical that the position or plane of measurement of the fastener be known relative to the camera (or cameras) used to make the video image. There are basically two ways of accomplishing this. One way is to develop a mechanical feed device that has the capability of accurately placing every fastener that is to be inspected in an identical, or nearly identical, location relative to the camera that produces the image. The other way is suggested in the '159 patent, and involves using orthogonally-positioned cameras to mathematically ascertain fastener location.

The problem with the first way is that it is extremely expensive, or even impossible, as a practical matter, to develop hardware that can repeatedly place fasteners near enough to the same location, such that slight deviations in the location of one fastener relative to the other will be significantly less than the errors in the measured fastener dimensions. For example, in the aerospace industry, it is not unusual for fastener tolerances to be as low as plus or minus 0.00025 inches. It may not, as a practical matter, be possible to design mechanical feed hardware that can repeatedly place a sequence of fasteners in the same location, such that the position of any one fastener relative to another deviates less than the magnitude of such a low tolerance. It is questionable, therefore, whether mechanical devices can be exclusively relied upon for proper fastener positioning.

For the above reason, the invention set forth in the '159 patent discards the concept of solely relying on mechanical feed hardware for fastener positioning. Instead, the patent discloses a feed gate arrangement that first centers and positions each fastener in an approximate manner, but then uses a pair of orthogonally-oriented cameras, in combination with known mathematical processing techniques, to determine the fastener's exact location relative to the cameras. Once fastener location is determined, its dimensions can then be calculated via known video imaging techniques.

The '159 device was an early prototype that has now been improved, resulting in the invention claimed here. One drawback of the prototype device was that the design of its feed gate mechanism was not the best or most efficient for feeding a variety of differently-sized fasteners to a reciprocating vacuum chuck. As will become apparent, the feed gate disclosed here is a new design that operates more efficiently, and provides greater flexibility than the '159 feed gate.

Further, it was discovered that the use of conventional LEDs as disclosed in the '159 patent, in combination with diffusers for providing back-lighting for the cameras, created shadowing that interfered with the ability of the system's video image processor to define an image whose dimensional accuracy was better than the dimensional tolerances being measured. For this reason, an improved back-lighting arrangement was developed that eliminated the shadowing problem.

Like the '159 patent, it is an objective of the present invention to provide an automated fastener inspection system having the capability of sequentially inspecting relatively large numbers of fasteners more efficiently than manual inspection. A key aspect of accomplishing such objective is to produce digitized images of fasteners whose dimensional accuracy is well within the bounds of the tolerances being measured. Hand-in-hand with this is the need to determine true fastener positioning which, in both the case of the present device and the device disclosed in the '159 patent, involves a mathematical processing technique done with a degree of accuracy that is also within the bounds of fastener tolerances. As will become apparent, the present invention solves certain problems associated with the '159 device, and provides an automated system that better meets the above objective.

SUMMARY OF THE INVENTION

The invention is a video imaging system adapted for measuring the dimensions of fasteners. The system includes a pair of orthogonally-oriented cameras, a feed gate, and a reciprocating chuck. The feed gate positions any given fastener to be measured at a certain predefined location. The reciprocating chuck attaches to the head of the fastener, while it is in the feed gate, and moves it to another location that is within the field of view of the cameras. The cameras are then used to create images of the fastener, such images being digitized in order to produce accurate fastener dimensions.

A pair of orthogonally-oriented back-lights, one for each camera, is positioned so that one of the back-lights is positioned opposite the field of view of one of the cameras. Each back-light is made of an array of LEDs, which define a clear fastener silhouette for the camera without shadowing, so that the created video image will show clearly-defined fastener edges and dimensions.

The feed gate has a frame with a guide rail support member slidably mounted thereto, and a guillotine gate that moves vertically upwardly and downwardly over the guide rail support member. One end of a fastener guide rail is attached to the latter, and extends outwardly from the frame for providing a guideway that feeds fasteners through the feed gate. Upward and downward movement of the guillotine gate respectively opens and closes the feed gate, in cooperation with the reciprocating chuck described above, to sequentially feed fasteners into the cameras' field of view.

The invention as summarized above will become more clearly and fully understood upon consideration of the following description taken in conjunction with the attached drawings.

BRIEF DESCRIPTION OF THE DRAWINGS

In the drawings, like reference numerals and letters refer to like parts throughout the various views, and wherein:

FIG. 7 is a side view of the feed gate shown in FIGS. 5 and 6;

FIG. 8 is a frontal view of the feed gate shown in FIG. 5;

FIG. 15 is a pictorial view of a vacuum chuck in accordance with the invention.

BEST MODE FOR CARRYING OUT THE INVENTION

Figure 1:
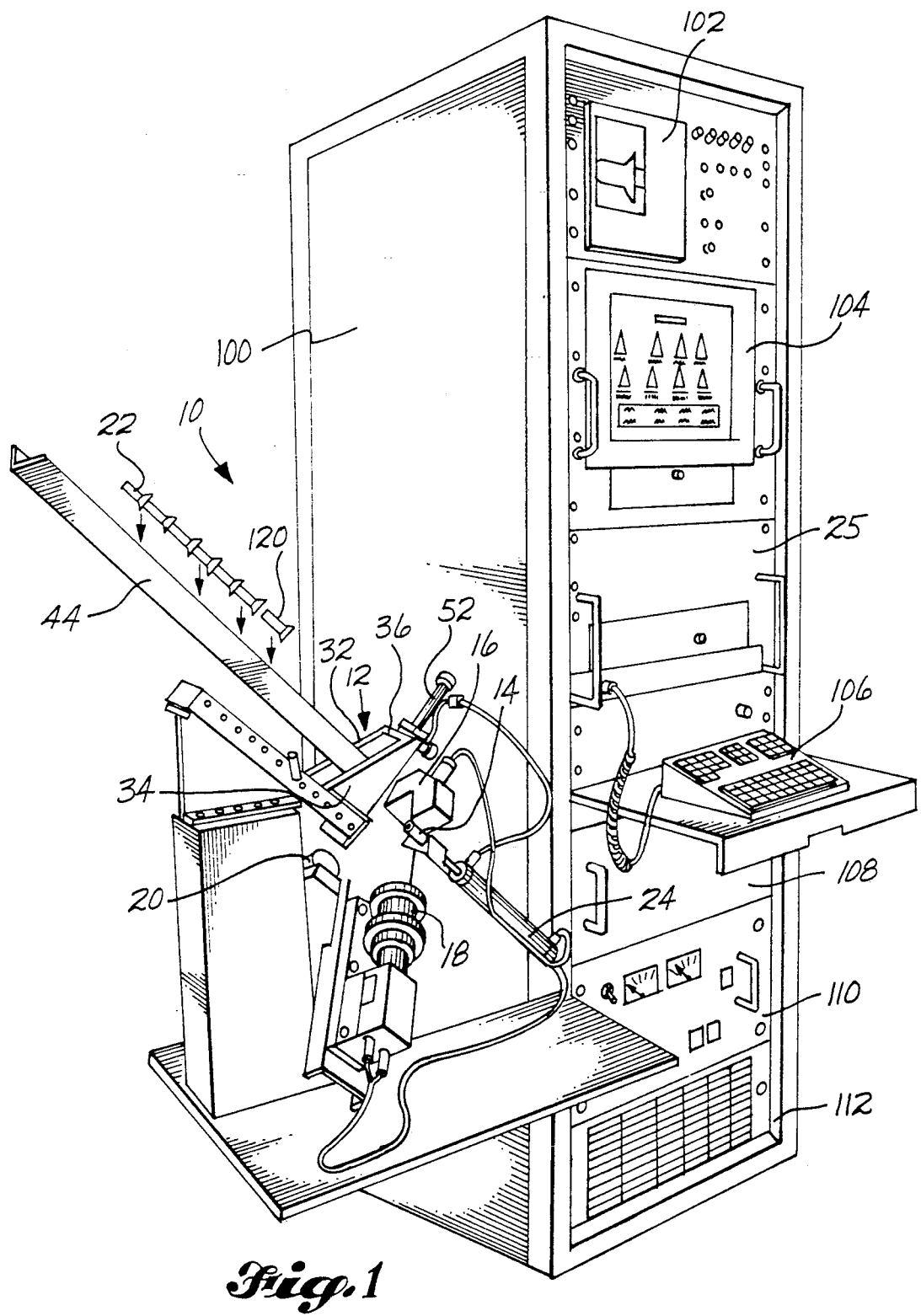
FIG. 1 is a pictorial view of a fastener inspection system in accordance with the invention.
Figure 10:
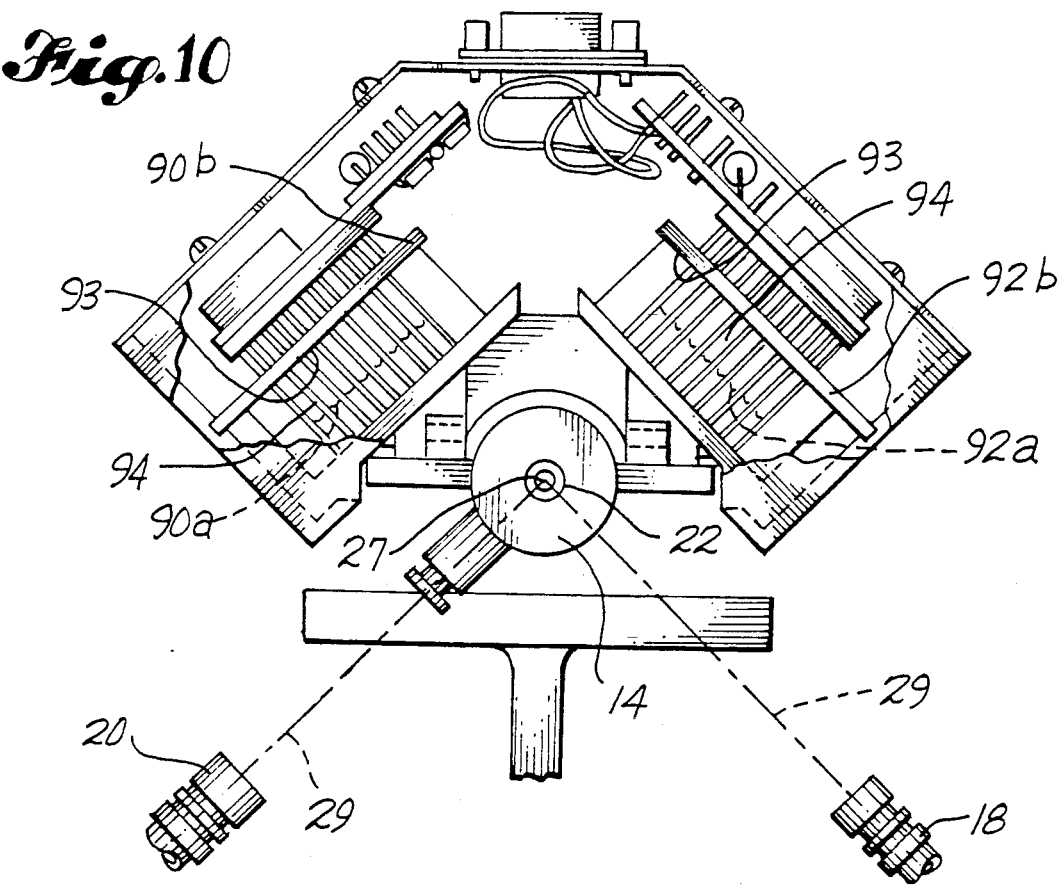
FIG. 10 is a frontal view of the housing shown in FIG. 9, and shows it in its normal position relative to the system's reciprocating vacuum chuck, for providing camera back-lighting of a fastener held by the chuck.

Referring now to the drawings, and first to FIG. 1, therein is shown at 10 a preferred embodiment of an automatic fastener inspection system in accordance with the invention. The system 10 includes a feed gate apparatus, or feed gate, indicated generally at 12, which includes a reciprocating vacuum chuck 14, and a light fixture 16. Two orthogonally-oriented cameras 18, 20 are positioned below the light fixture 16 for creating a video image of a fastener 22 held by the chuck 14 (see FIG. 10). A pneumatic cylinder 24 is operable to reciprocate the chuck 14 back and forth, between a position near the feed gate 12, where it receives a fastener 22 from the feed gate, and the position shown in FIGS. 1 and 2. This procedure is identical to what was shown and described in FIGS. 6 and 7 of the '159 patent.

Figure 2:
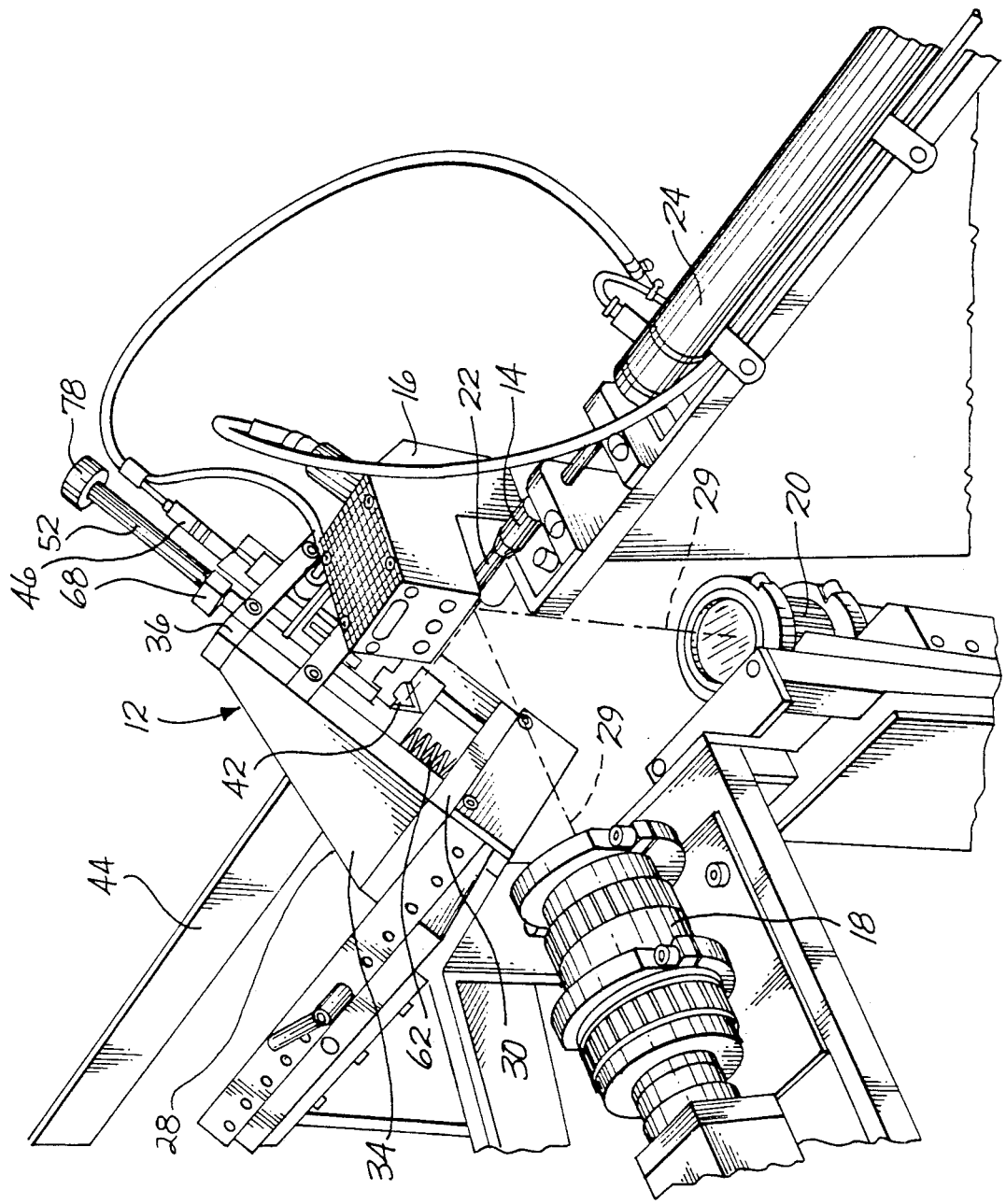
FIG. 2 is an enlarged pictorial view of a feed gate portion, or feed gate, and orthogonally-oriented cameras of the system shown in FIG. 1, but is taken from an angle generally looking upwardly at the system's feed gate.

In the second position shown in FIGS. 1 and 2 (spaced from the feed gate 12), the fastener 22 is within the field of view of cameras 18, 20, so that a video image may be taken of the fastener. The cameras' "field of view" may or may not include the entire length of the fastener 22. For example, for those fasteners typically used in aerospace applications, it would probably be necessary for each camera 18, 20 to have an unobstructed view of the fastener's head 21 (see FIG. 11), and at least ⅛ inch of its shank 23. The term "field of view," therefore, should be taken to mean either an unobstructed view of the entire fastener 22, or a more restricted view of the fastener as was just defined.

In all important aspects, the chuck 14 is identical in operation to the chuck 36 disclosed in the '159 patent. That is to say, a vacuum line 84 creates a suction for holding fasteners to the end of the chuck, as it moves away from the feed gate 12. As is shown in FIG. 15, unlike the chuck 36 disclosed in the '159 patent, the chuck 14 has a circular face portion 82, spaced from the chuck's body 83, for physically spacing each fastener's head from the chuck's body. The reason for this is described later.

Figure 11:
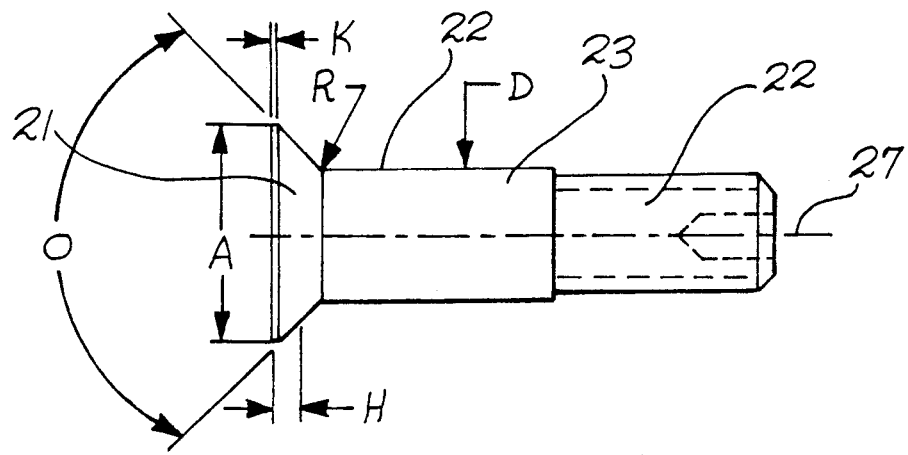
FIG. 11 is a schematic view of a typical fastener that is to be inspected by the system shown in FIG. 1, and illustrates certain fastener tolerances that may be measured by the system.

The system 10 is capable of inspecting flat or flush head fasteners that are nominally ⅛ to ½ inch in diameter. The specific dimensions that are measured or inspected by the system are illustrated in FIG. 11. Directing attention there, the system 10 has the capability of measuring shank diameter D, head diameter A, gauge protrusion H, fillet radius R, head angle $\theta$, land K, and both fastener perpendicularity and eccentricity.

Figure 3:
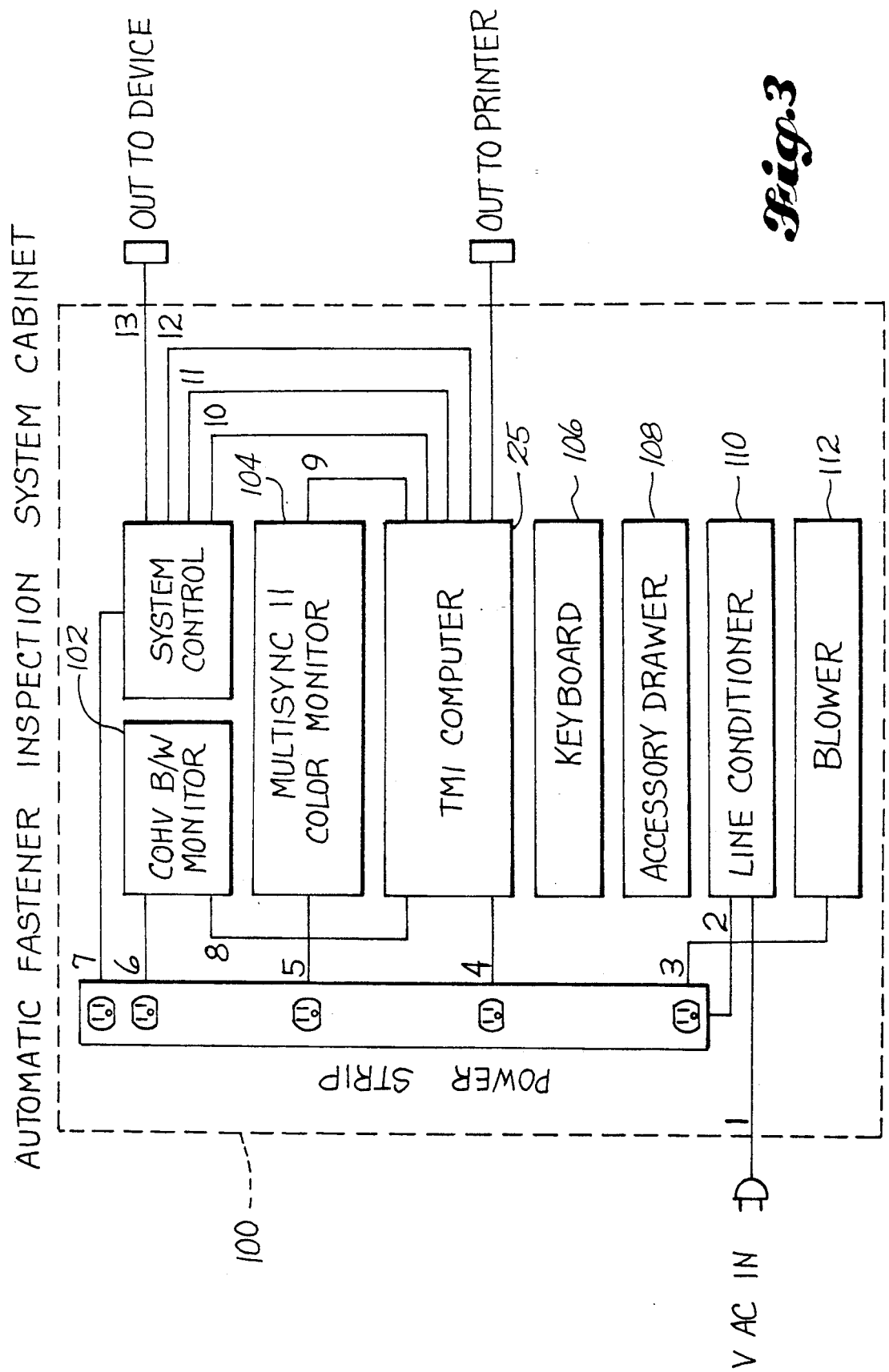
FIG. 3 is a schematic view illustrating the control components of the system shown in FIG. 1.

Conventional machine vision technology is used to make all of these measurements. The vacuum chuck 14 first positions the fastener 22 in the field of view of cameras 18, 20, where the image of the fastener is taken. The image produced by each camera is captured by a conventionally-known video digitizing card that is installed in a conventional 80386 personal computer 25 (see FIG. 3). Known techniques involving algorithms are used to sift out the digitized information required to produce the above-mentioned measurements.

Regardless of size, it is necessary that the system 10 position each fastener before the cameras 18, 20 within certain constraints. That is to say, and as mentioned above, each camera 18, 20 should preferably have an unobstructed field of view of the entire head 21 of each fastener, and at least ⅛ inch of its shank 23. Further, the fastener's centerline 27 (see FIG. 10) should be within 2 degrees of true perpendicularity to the center axis 29 of each camera lens (see FIG. 10). For this reason, it is preferable to hold each fastener 22 by its head end instead of its shank end. Further, it is important for the system 10 to have the capability of feeding one fastener at a time to the chuck 14 without substantially changing the centerline of delivery (corresponding to fastener centerline 27 in FIG. 10) from fastener to fastener. For this reason, the feed gate 12 has a guillotine-style gate 26 with an adjustable opening that accomplishes uniformity in centerline of delivery from part to part.

Figure 5:
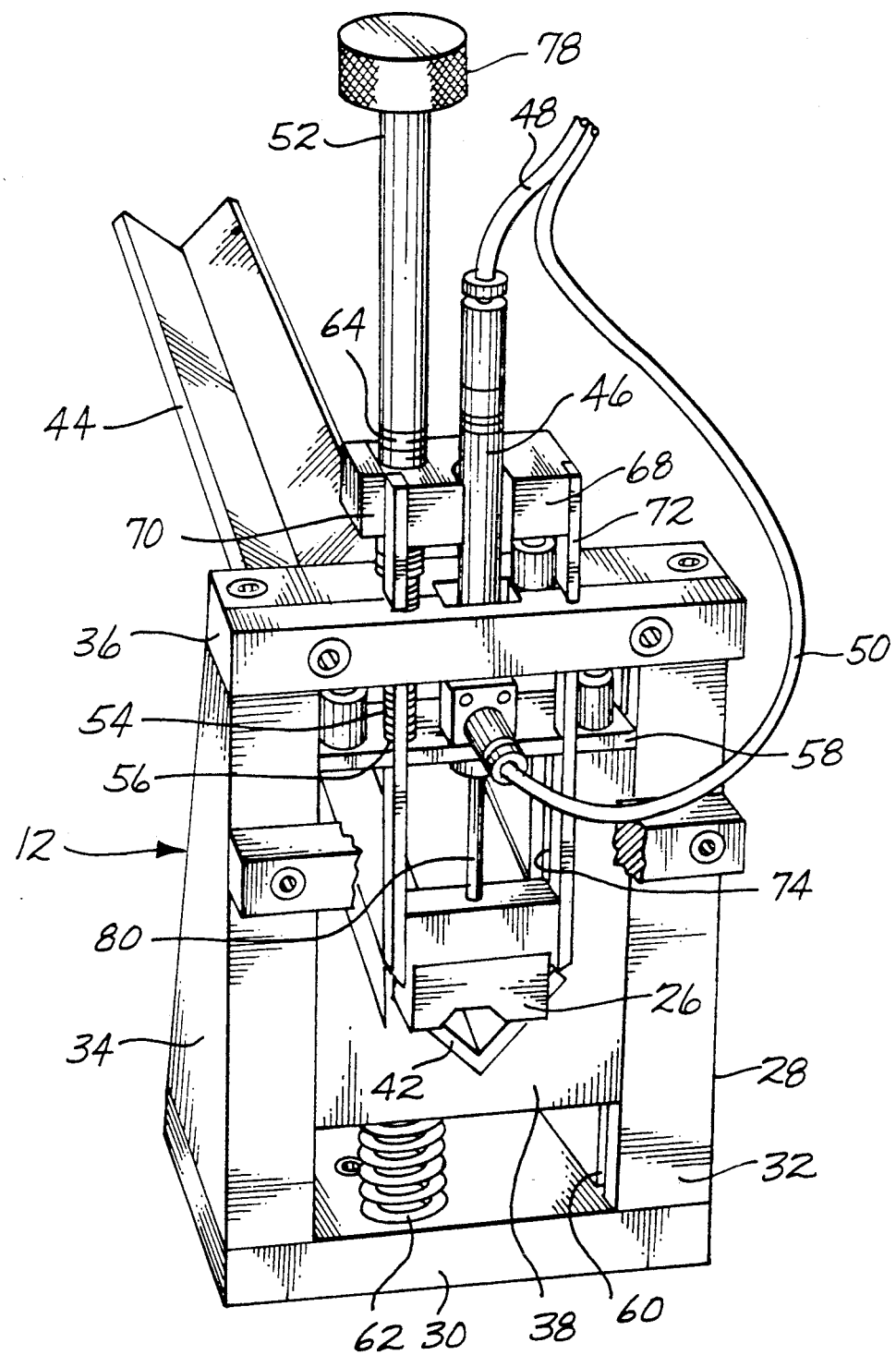
FIG. 5 is an enlarged pictorial view of the feed gate shown in FIG. 1, looking at the front of the feed gate.

Referring now to FIG. 5, for example, where the feed gate 12 is generally shown, it is made of a frame 28, consisting of a base 30 and a pair of spaced-apart vertical legs 32, 34. Extending across the top of the legs 32, 34 is an overhead support 36 that will be further described later.

Slidably mounted between vertical legs 32, 34 is a guide rail support member 38. Such member has a "V"-shaped portion 40 (see FIG. 8) shaped to receive one end 42 of a similarly shaped channel or rail 44 (see FIGS. 5 and 6). The "V" of the rail 44 opens upwardly for holding a series or plurality of fasteners (not shown) which are to be fed through feed gate 12. Preferably, the rail 44 extends outwardly or rearwardly from the back side of frame 28. As is apparent from FIG. 1, the feed gate 12, including rail 44, and the vacuum chuck 14 are all tilted at a certain slope sufficient to enable fasteners to slide downwardly along the rail by the force of gravity. It has been determined that a slope of 45 degrees is adequate for this purpose. Such slope also reduces the vacuum force required by the chuck 14, in order to attach to each fastener head as it is fed through feed gate 12.

The rail's lower end 42, in combination with the guide rail support member 38, defines a lower half of a feed gate region or area through feed gate 12. As is apparent, the upper half of the same region or area is defined by the previously-described guillotine gate 26.

The guillotine gate 26 is movable vertically upwardly and/or downwardly over the end 42 of the rail 44. This is accomplished by a double-acting air cylinder 46 having two air feed lines 48, 50. Feeding pressurized air through line 50 moves gate 26 upwardly, while pressurizing line 48 conversely moves it downwardly, thus closing the feed gate region.

Figure 6:
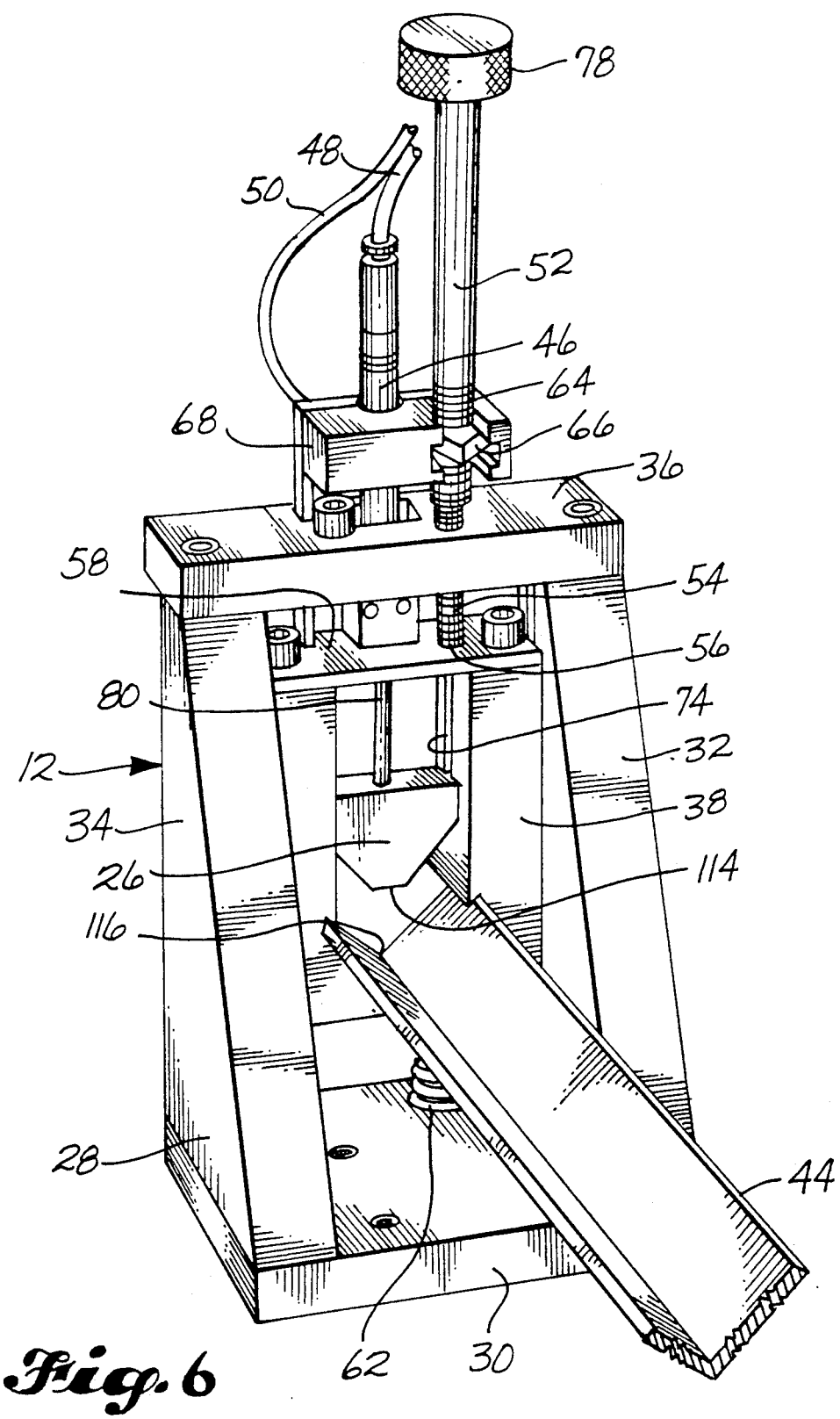
FIG. 6 is a view like FIG. 5, but is taken looking at the back side of the feed gate.

As is self-evident from FIGS. 5 and 6, when the guillotine gate 26 is in its downwardmost position, it may be preferable to construct the bottom edge 114 of the gate so that a small gap is left between such edge and the bottommost point 116 of rail 44 (see FIG. 6). Such space or gap should in any event be too small to permit the head of a fastener to pass between the gate 26 and channel 44, but may be sufficiently large to permit the fastener's body 23 to pass. In this manner, the feed gate 12 operates similarly to the feed gate disclosed in the '159 patent, at least with respect to sequentially passing fasteners 22 through the feed gate.

A thumb screw 52 adjusts the vertical position of guillotine gate 26 relative to the rail's end 42. Such screw 52 has a first threaded portion, or end portion 54, in threaded engagement with the frame's top overhead support 36. The end of such portion, which is indicated at 56 in FIGS. 6 and 8, abuts directly against a plate 58 that is fixedly attached to the top of guide rail support member 38. The guide rail support member 38 slides upwardly or downwardly in frame 28 by vertical keyways 60 that are located on the inside surfaces of legs 32, 34. Turning thumb wheel screw 52 clockwise causes guide rail support member 38 to be pushed downwardly, against the bias of a spring 62, where the latter interconnects member 38 and frame base 30.

Referring now to FIGS. 5, 6, 7 and 8, the thumb wheel screw 52 also has a second threaded portion 64 positioned axially above end portion 54. A follower nut 66 is in threaded engagement with the latter threaded portion 64, and is captured by a block 68, to define a nut/block assembly. A pair of spaced-apart, downwardly-extending guide legs 70, 72 are fixedly attached to the block 68. These legs 70, 72 define the downwardmost position of travel for the guillotine gate 26. That is to say, the guillotine gate 26 normally reciprocates upwardly and downwardly relative to legs 70, 72. The distal ends of legs 70, 72 have catches that define the gate's downwardmost position. However, as would be apparent to the skilled person, this functional result could be accomplished in more than one way.

In preferred form, the first threaded portion 54 of thumb wheel screw 52 has a throw or pitch of approximately 28 threads per inch. The second portion 64 has a pitch of approximately 16 threads per inch. As the screw 52 is turned clockwise, the follower nut and block assembly 66, 68, which adjusts the guillotine gate's position, moves upwardly relative to threaded portion 64, and toward the screw's head 78. At the same time, the screw 52 itself translates downwardly, because it is directly engaged with overhead support 36.

Selecting the thread pitches in the above-described manner results in the nut and block assembly 68, 66 moving upwardly from its initial position as the guide rail support member 38 moves downwardly for each turn of screw 52 clockwise (or counterclockwise, for that matter). As should be apparent, this in turn causes the downwardmost position of the guillotine gate 26 to translate upwardly. Thus, clockwise turning of screw 52 causes the downwardmost position of gate 26 to open with rail 44, and counterclockwise turning causes such members to close.

The air cylinder 46 driving guillotine gate 26 upwardly or downwardly is not fixedly connected to nut and block assembly 66, 68. Instead, it is connected directly to plate 58 which, as described above, is also fixedly connected to guide rail support member 38. The air cylinder 46 drives guillotine gate 26 by means of a shaft 80. Although it is not shown in the drawings, such shaft extends into the body of air cylinder 46, where there is a piston that divides the cylinder 46 into upper and lower chambers. When the downwardmost position of gate 26 is adjusted by means of screw 52, the position of such piston merely changes from where it was initially located, sliding within cylinder 46, meaning that it is not necessary for the piston assembly 46, as a whole, to be moved along with gate 26.

Image processing is the art of transforming a standard video image into computer data, and then further transforming such data into some desirable answer for the user of the process. In the present case, the video image is of a silhouetted fastener 22 moved into the field of view of cameras 18, 20 by vacuum chuck 14. As mentioned previously, this image is digitized by a board inside the system's computer 25 (see FIG. 3). By way of example, a Matrox (trademark) image processing board in conjunction with a Texas Microsystem (trademark) 80386 Industrial Personal Computer would provide the needed computing capability.

Figure 12:
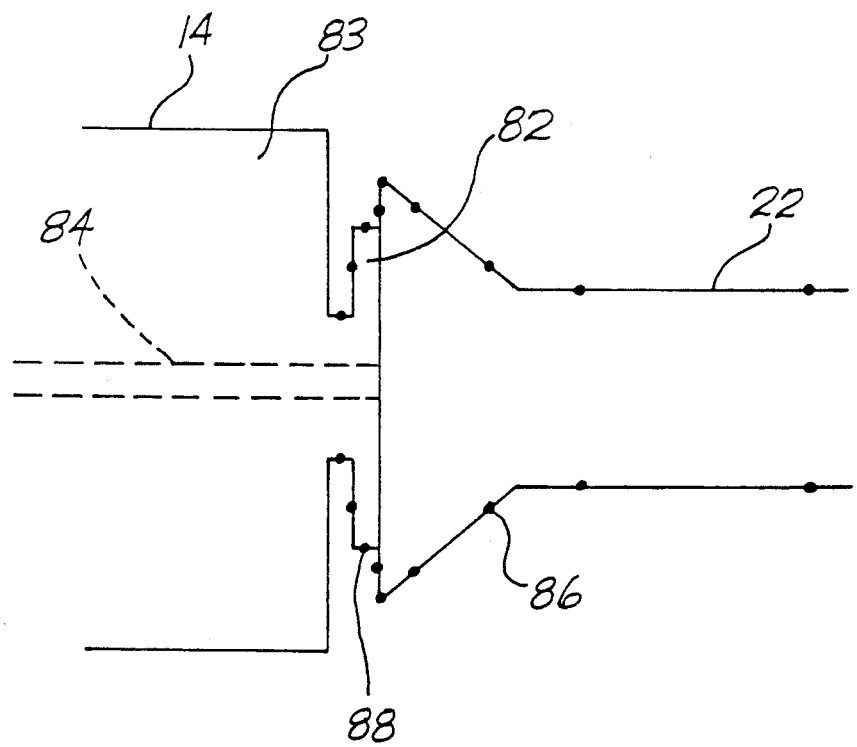
FIG. 12 is a schematic view illustrating how the video image of a silhouetted fastener, such as the fastener shown in FIG. 12, is digitized.

Once the image is taken by cameras 18, 20, the data is processed once in what is called a "sparse scan" (see FIG. 12) which locates several key points on the fastener 22, and on the vacuum chuck 14. As mentioned above, it is preferable that the chuck 14 has a circular face portion 82, spaced from the chuck's body 83, for providing a location where the fastener's head 21 may be attached to the chuck. As is shown in FIG. 12, a vacuum line 84 holds the fastener's head 21 to such portion 82 by means of suction.

The reason it is desirable to separate chuck face portion 82 from the chuck's body 83 is so that the fastener's head will be clearly separated from the chuck 14 for video imaging. The sparse scan just mentioned, not only locates certain key points on the fastener 22, but also locates such points on the chuck, as is indicated by arrows 86, 88, respectively in FIG. 12. For this reason, circular portion 82 of the chuck 14 makes it easier to distinguish between fastener structure and adjacent chuck structure.

Eight utility functions should preferably be used to locate edges in sparse scans. One function finds a black-to-white transition scanning upward, another finds a white-to-black transition scanning upward The other six do the same thing, but for scanning downward, to the left, or to the right. Each one of the eight functions requires the following arguments or inputs: the row or column to scan; the row or column to start and stop looking; and the threshold value for determining a black-to-white transition. Once the key or edge points 86, 88 are located via the sparse scan, a "sub-pixel" scan relocates key points with precision, and produces equations that define the key edges for the fastener to be inspected. This is schematically indicated in FIG. 13.

Figure 14:
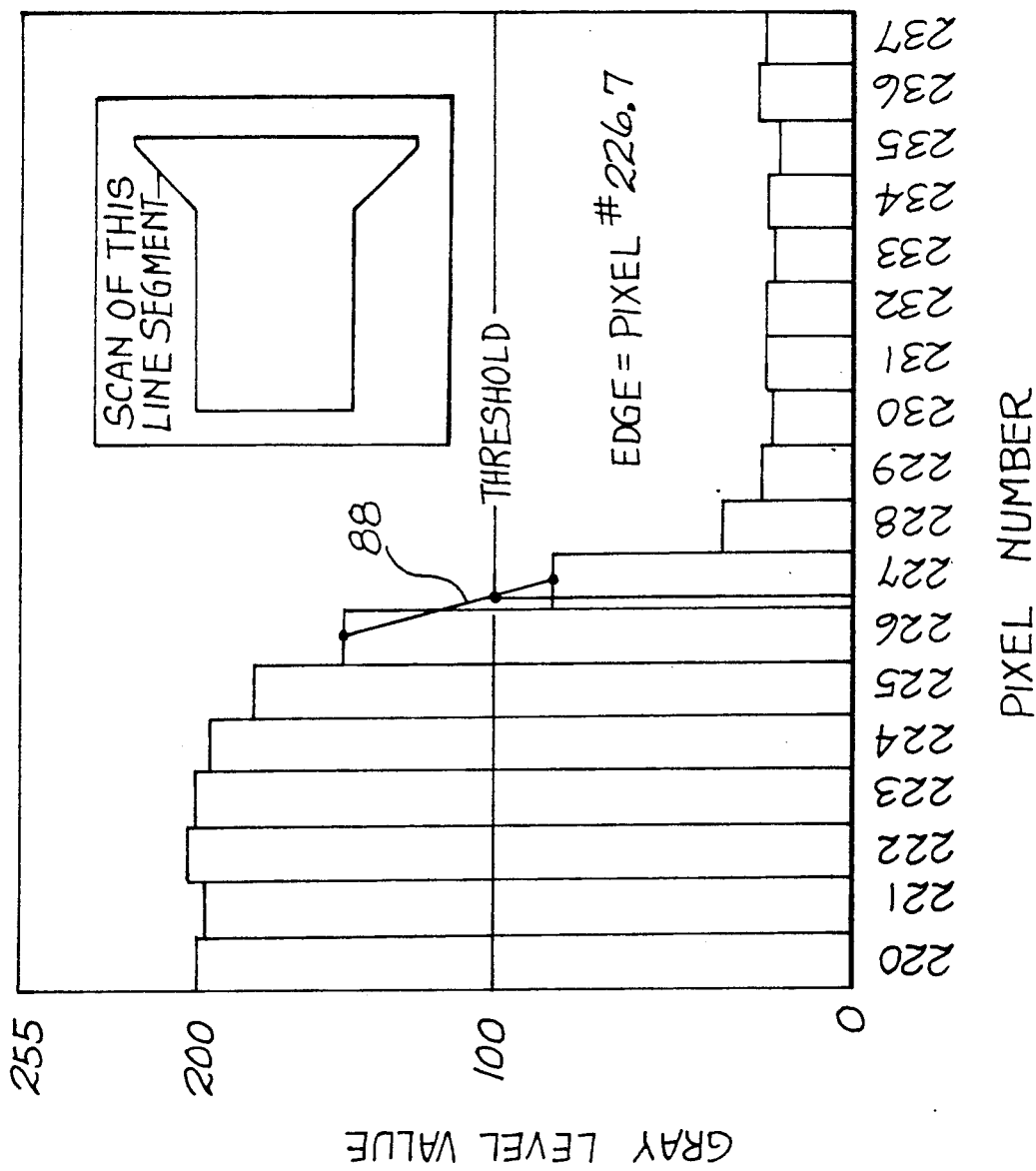
FIG. 14 is a schematic view illustrating interpolation between certain pixels when two adjacent pixels' gray level values are on opposite sides of a certain threshold.

Sub-pixel scanning refers to a well-known technique in which brightness levels assigned to pixels are used to calculate the portion of a pixel in which a light-to-dark transition, or edge, might be said to occur. Normally, brightness or "gray levels" exist on a scale of zero (indicating black) to 255 (indicating white). When scanning for the location of an edge, a threshold gray level is selected. The value of such threshold must be determined empirically so that there is no bias between leading and trailing edges. When two adjacent pixels' gray level values are on opposite sides of the threshold, the location of the edge is taken from an interpolation between these pixels. This is schematically indicated at 88 in FIG. 14. The location of such edge can be repeatably calculated to within 1/10 of a pixel, if the edge is well contrasted, which is a requirement for high accuracy of measurement.

Figure 13:
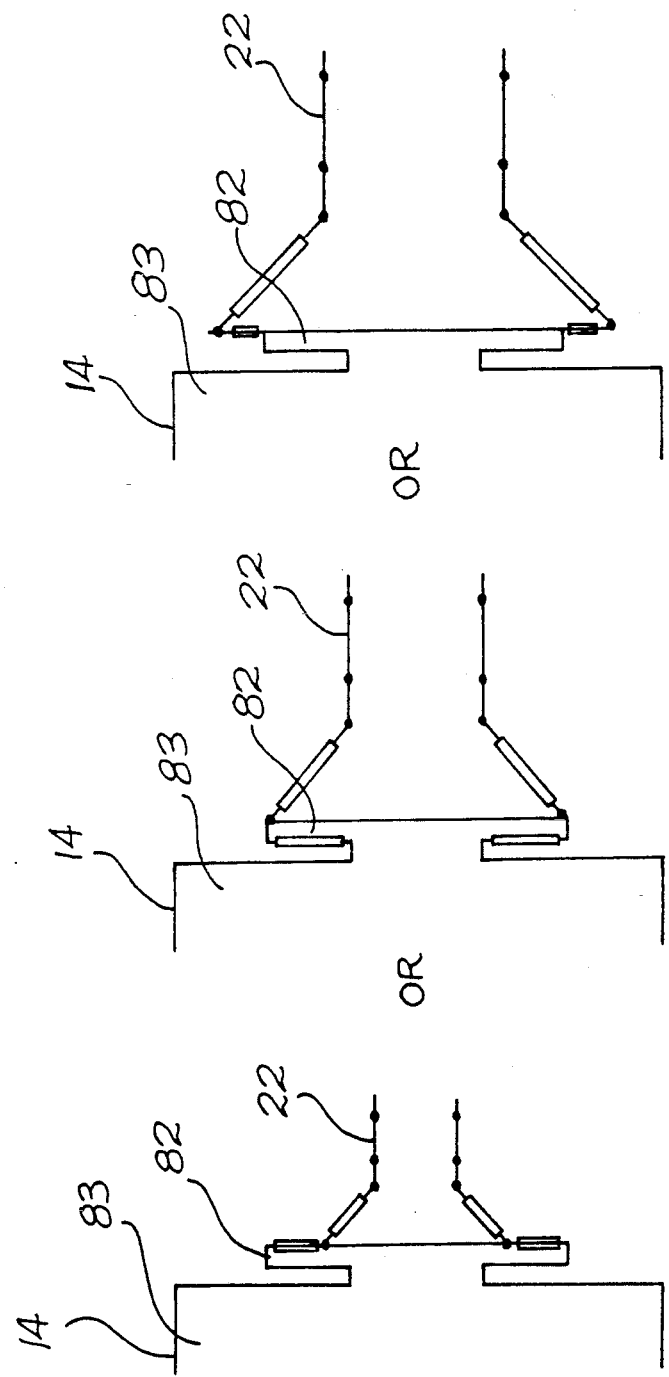
FIG. 13 is a view similar to FIG. 12, but schematically indicates a "sub-pixel scan" for relocating the key points of a fastener to be inspected by the system of FIG. 1.

For the precision scanning shown in FIG. 13, four utility functions should be used. The approximate (X, Y) location of the edge to be scanned is supplied to the processing board as an argument, and the threshold is then recalculated to match the neighborhood gray levels. The edges produced by such method are scaled in pixels rather than inches.

In order to accurately transform the scale from pixels to inches, two things must occur. First, a specimen of known dimensions must be scanned to calibrate the system 10. Second, the plane which is normal to the axis 29 of the lens of each camera 18, 20 and the bisector 27 of the fastener (plane of measurement) must be defined. This second requirement results from the change in apparent size when an object is moved either closer to or farther from a camera.

As mentioned previously, there are two methods for defining the plane of measurement. One is to mechanically position the fastener to be measured with precision, and the other is to adjust the focus of the camera lens until a focus-measuring algorithm determines that the focus on the fastener's edge is maximized. The latter approach is taken in the present invention.

As mentioned previously, the system 10 employs two orthogonally-oriented cameras 18, 20. Each camera 18, 20 is used to first calculate the offset of the shank centerline 27 to the centerline of the chuck 14. The offset measured by one camera is used to scale the measurements of the other camera, and vice versa. There are many advantages to this approach: First, it provides two views of each fastener, thereby providing twice as much information. Secondly, it enables the system 10 to measure ovality, eccentricity, and perpendicularity of each fastener to be measured using root mean square calculations from the measurements of each camera 18, 20. Lastly, and as mentioned previously, the feed mechanism is greatly simplified, requiring only that the feed gate and chuck apparatus 12, 14 place each fastener to be measured within the field of view of both cameras 18, 20.

As mentioned above, an important aspect of the system 10 is that excellent contrast be provided for each fastener 22 in order to implement the pixel scanning methods described above. Directing attention now to FIGS. 2, 9 and 10, the light fixture 16 is designed to provide high intensity light from a compact source.

Figure 9:
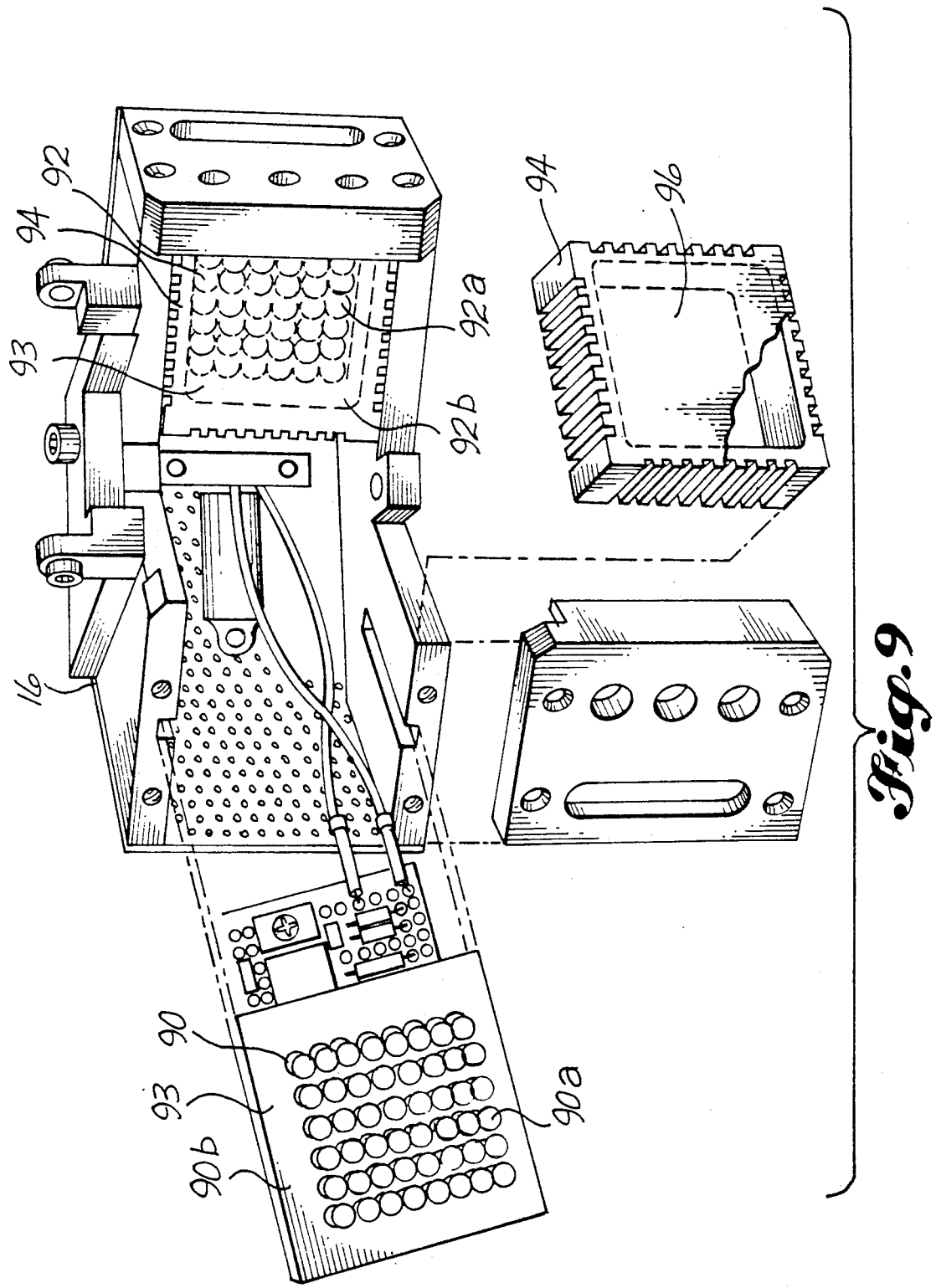
FIG. 9 is an exploded view of a back-light housing in accordance with the invention.

As can be seen in FIG. 9, the fixture 16 includes two arrays of diodes 90, 92. Each array preferably consists of a six-by-eight matrix of individual diodes 90a, 92a placed upon a flat-side surface 93 of plates 90b, 92b, each plate being approximately 1.5 by 1.5 inches in size. The integrated light from each array provides an evenly-distributed light source for providing fastener backlighting. Each array 90, 92 is shielded by a rectangular shield 94, surrounding each array 90, 92, and is covered by a translucent plate 96. Such a light source provides high intensity, evenly-distributed light that creates the high contrast fastener silhouette needed to make accurate dimensional measurements via video imaging.

In operation, the system 10 must first be calibrated before it is used to measure a plurality of fasteners. This is accomplished by first feeding a gauge pin 120 into the system (see FIG. 1), which is precision ground so that its measurements can provide a standard for subsequent measurements to be taken. At the beginning of an inspection run, which would normally include a plurality of fasteners, the operator of the system 10 first inserts the proper gauge pin 120 into guide rail 44, and it is thereafter scanned by cameras 18, 20. Its dimensions are then digitized for use as a standard.

The gauge pin is then followed by a series of fasteners 22 placed in head-to-toe fashion in guide rail 44 so that they extend upwardly along guide rail 44. Their dimensions are then measured and compared with gauge pin dimensions in order to inspect fastener tolerances. The system 10 is particularly well-suited for inspecting sample runs of approximately two dozen fasteners.

Figure 4:
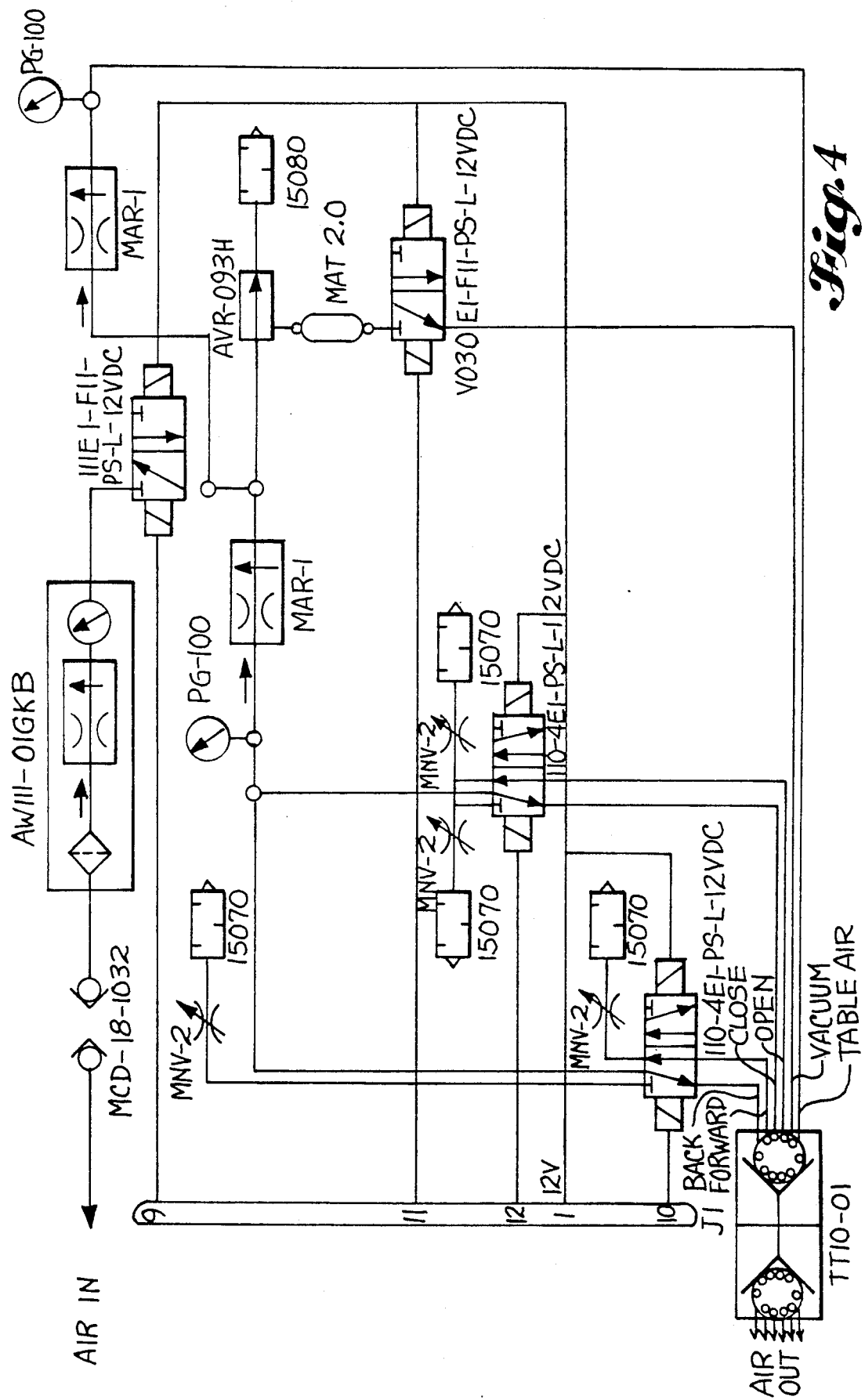
FIG. 4 is a schematic view illustrating an air pressure control network for operating the inspection system's feed gate and reciprocating vacuum chuck.

Referring again to FIG. 1, the control components for the system 10 may be housed in a suitable cabinet 100, and include a conventional black-and-white monitor 102, for displaying the image of each fastener scanned; a color monitor 104 for displaying test data; a keyboard 106 and computer 25 for respectively inputting information into the system 10, and for operating system components in the previously-described manner; an accessory drawer 108; and a line conditioner and blower 110, 112. These components are also schematically indicated in FIG. 3. The line conditioner 110 controls the vacuum and pressurized air used to move the various components previously described. Its control configuration is schematically indicated in FIG. 4.

Thus, having provided a description of the best mode for carrying out the invention as it is currently known, it is to be appreciated that the above-described system 10 could be changed in many ways without departing from the overall spirit and scope of what is considered to be the invention. Accordingly, none of the preceding description should be taken in a strictly limiting sense. The scope of what is considered to be the invention is to be determined by interpreting the patent claims which follow, wherein such claims are to be interpreted in accordance with the well-established doctrines of patent claim interpretation.

What is claimed is:

1. A video imaging system for measuring the dimensions of a fastener, comprising:
    a pair of orthogonally-oriented cameras;
    a feed gate operable to position said fastener at a certain predefined location;
    reciprocating chuck member operable to move said fastener from said predefined location into the field of view of said cameras;
    a pair of orthogonally-oriented back-lights, one each of said back-lights being directly opposite the field of view of one of said cameras, and oriented so that said fastener is positioned between said camera and said back-light when said fastener is moved into said camera's field of view;

wherein each back-light includes a plurality of light-emitting diodes forming an array of diodes, said array being longer and wider, respectively, than the length and width of any fastener dimensions to be measured, for providing a uniform silhouette of said fastener, without shadows, for each camera; and wherein said feed gate includes:

a frame;

a guide rail support member slidably mounted to said frame for vertical movement upwardly or downwardly relative to said frame;

a spring interconnecting said frame and guide rail support member, with said spring being biased to urge said guide rail support member normally upwardly;

a guide rail having an upwardly-opening channel shaped to hold a plurality of fasteners along a line in substantially head-to-toe fashion, wherein an end of said guide rail is connected to said guide rail support member, and defines a lower part of a feed gate region, said guide rail extending outwardly from one side of said frame;

a guillotine gate that is movable vertically upwardly and downwardly over said end of said guide rail, said guillotine gate defining an upper part of said feed gate region, wherein said guillotine gate is operable to block fastener travel through said gate region when it is in its downwardmost position; and an adjustment screw having a first threaded portion with a certain pitch, and a second threaded portion with another pitch, said first threaded portion being in threaded engagement with said frame, and drivingly connected to said guide rail support member, for adjusting the vertical position of said end of said guide rail relative to said guillotine gate in response to a turning movement of said screw, said second threaded portion being in driving engagement with said guillotine gate for simultaneously adjusting the downwardmost position of said gate relative to said guide rail as said screw turns, wherein said first and second thread pitches are selected in a manner so that said end of said guide rail and said downwardmost position of said gate approach or move away from each other generally symmetrically depending on the direction of screw rotation.

2. The video imaging system of claim 1, wherein said guide rail extends outwardly from one side of said frame at a certain slope sufficient to cause said fasteners to slide downwardly along said guide rail's upwardly-opening channel by the force of gravity into said feed gate region.

3. The video imaging system of claim 2, including air cylinder drive means for reciprocating said guillotine gate upwardly and downwardly, to respectively open and close said gate, for passing a sequence of fasteners through said feed gate region.

4. A feed gate apparatus for sequentially feeding a plurality of fasteners through a certain location, comprising:

a frame;

a guide rail support member slidably mounted to said frame for vertical movement upwardly or downwardly relative to said frame;

a spring interconnecting said frame and guide rail support member, with said spring being biased to urge said guide rail support member upwardly;

a guide rail having an upwardly-opening channel shaped to hold a plurality of fasteners along a line in substantially head-to-toe fashion, wherein an end of said guide rail is connected to said guide rail support member, and defines a lower part of a feed gate region, said guide rail extending outwardly from one side of said frame;

a guillotine gate that is movable vertically upwardly and downwardly over said end of said guide rail, said guillotine gate defining an upper part of said feed gate region, and wherein said guillotine gate is operable to block fastener travel through said gate region when it is in its downwardmost position;

an adjustment screw having a first threaded portion with a certain pitch, and a second threaded portion with another pitch, said first threaded portion being in threaded engagement with said frame, and drivingly connected to said guide rail support member, for adjusting the vertical position of said end of said guide rail relative to said guillotine gate in response to a turning movement of said screw, said second threaded portion being in driving engagement with said guillotine gate for simultaneously adjusting the downwardmost position of said gate relative to said guide rail as said screw turns, wherein said first and second thread pitches are selected in a manner so that said end of said guide rail and said downwardmost position of said gate approach or move away from each other generally symmetrically depending on the direction of screw rotation.

5. The feed gate apparatus of claim 4, wherein said guide rail extends outwardly from one side of said frame at a certain slope sufficient to cause said fasteners to slide downwardly along said guide rail's upwardly-opening channel by the force of gravity into said feed gate region.

6. The feed gate apparatus of claim 5, including air cylinder drive means for reciprocating said guillotine gate upwardly and downwardly, to respectively open and close said gate, for passing a sequence of fasteners through said gate region.

7. The feed gate apparatus of claim 4, further including:

a pair of orthogonally-oriented cameras;

a reciprocating chuck member operable to move each fastener from said feed gate region into the field of view of said cameras;

a pair of orthogonally-oriented back-lights, one each of said back-lights being directly opposite the field of view of one of said cameras, and oriented so that said fastener is positioned between said camera and said back-light when said fastener is moved into said camera's field of view; and wherein each said back-light includes a plurality of light-emitting diodes forming an array of diodes, said array being longer and wider, respectively, than the length and width of any fastener dimensions to be measured, for providing a uniform silhouette of said fastener, without shadows, for each camera.

8. The video imaging system of claim 7, wherein said pair of orthogonally-oriented back-lights comprises:
a housing;
a flat mounting plate for each array of said light-emitting diodes, said plate being connected to said housing, and wherein each array is mounted to one side surface of each plate, said plates being orthogonally oriented relative to each other;
a rectangularly-shaped shield surrounding each array and projecting outwardly from said surface of said plate, said shield defining a space within which said array is received, and an opening over said array; and
a translucent member positioned over said space, for diffusing the light from said array.

* * * * *